May 2, 1961 R. E. CROSS 2,982,004
MACHINE
Filed March 28, 1957 8 Sheets-Sheet 1

INVENTOR.
Ralph E. Cross
BY
ATTORNEYS

May 2, 1961 R. E. CROSS 2,982,004
MACHINE
Filed March 28, 1957 8 Sheets-Sheet 3

INVENTOR.
Ralph E. Cross
BY
Harness, Dickey & Pierce
ATTORNEYS.

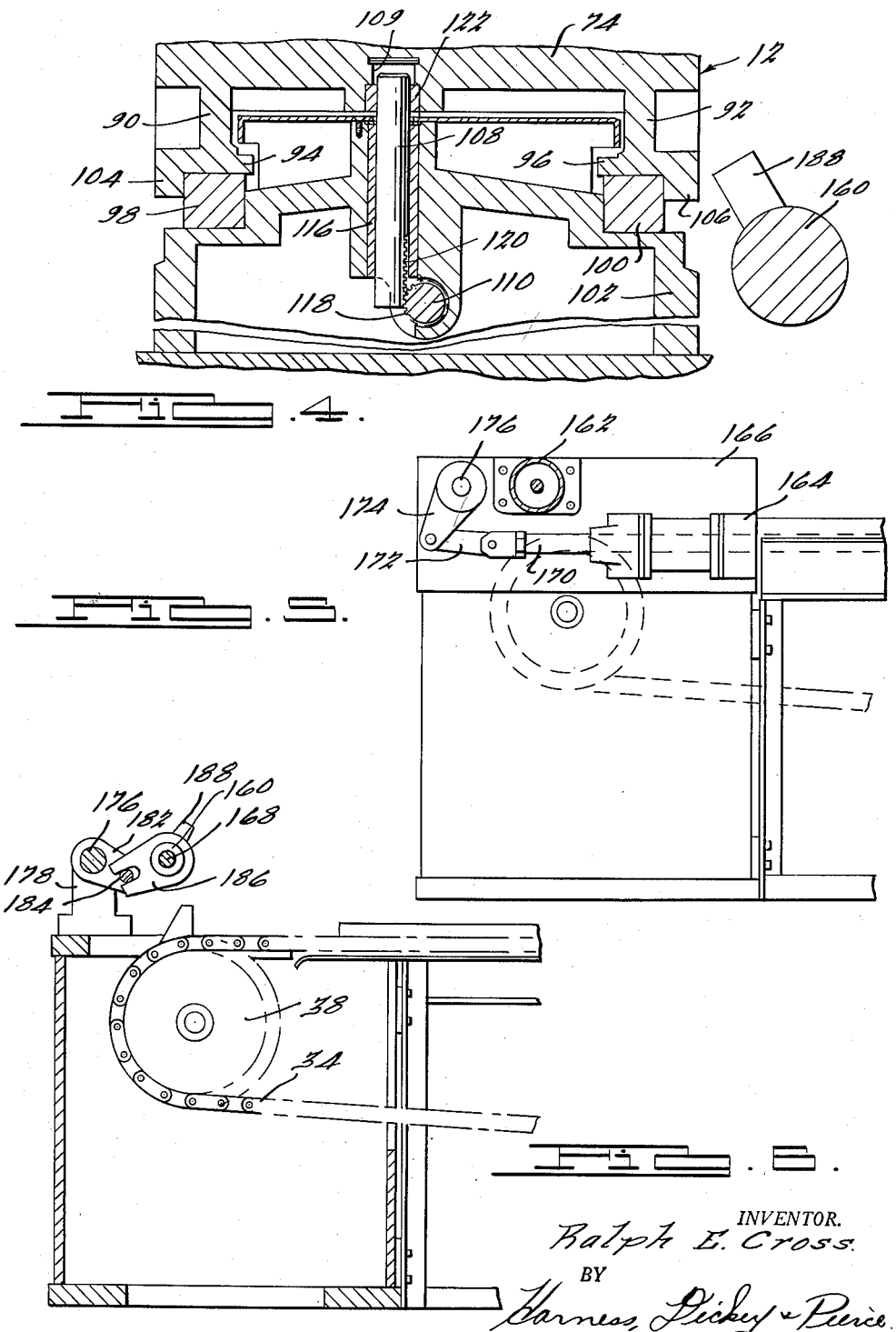

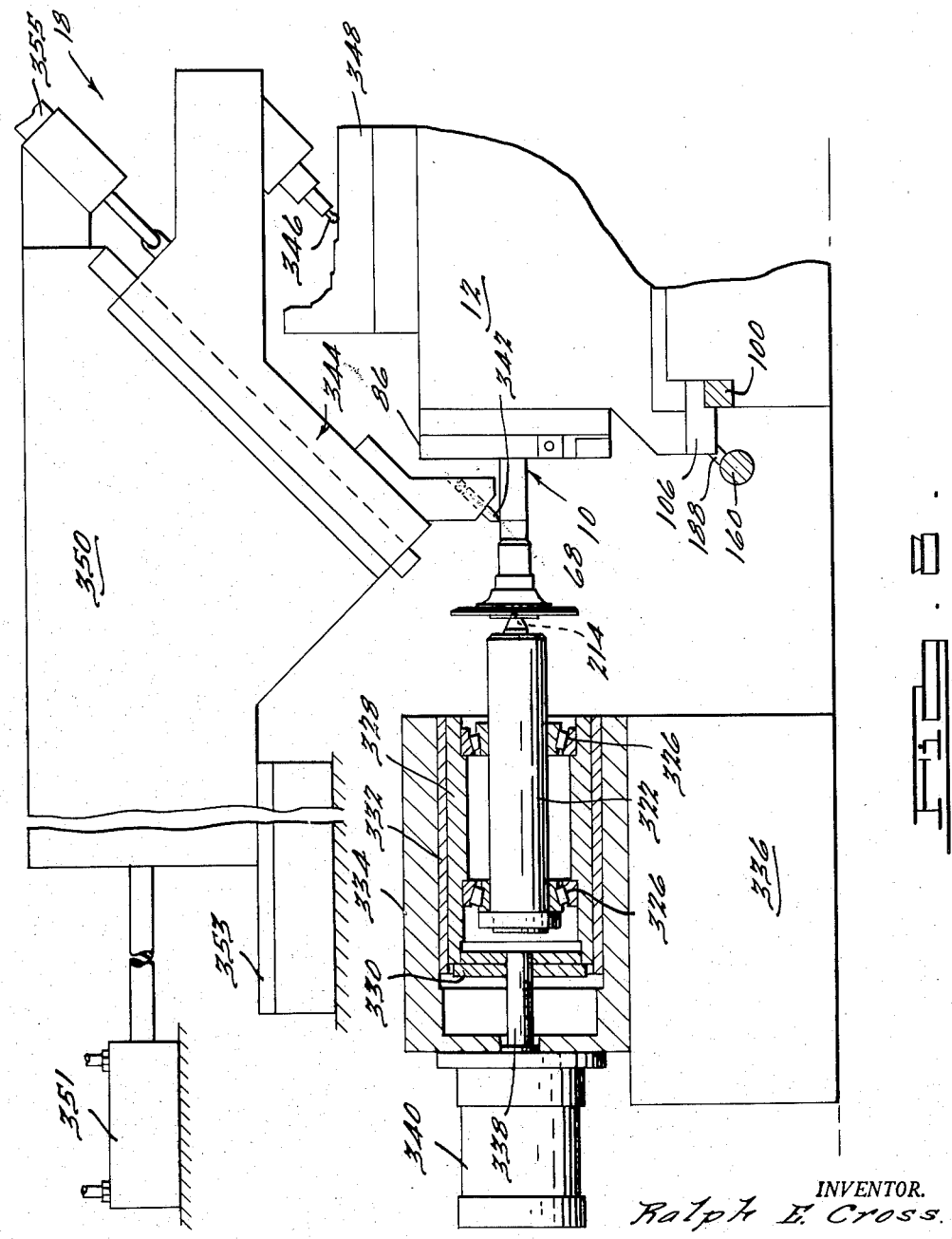

May 2, 1961 R. E. CROSS 2,982,004
MACHINE
Filed March 28, 1957 8 Sheets-Sheet 6
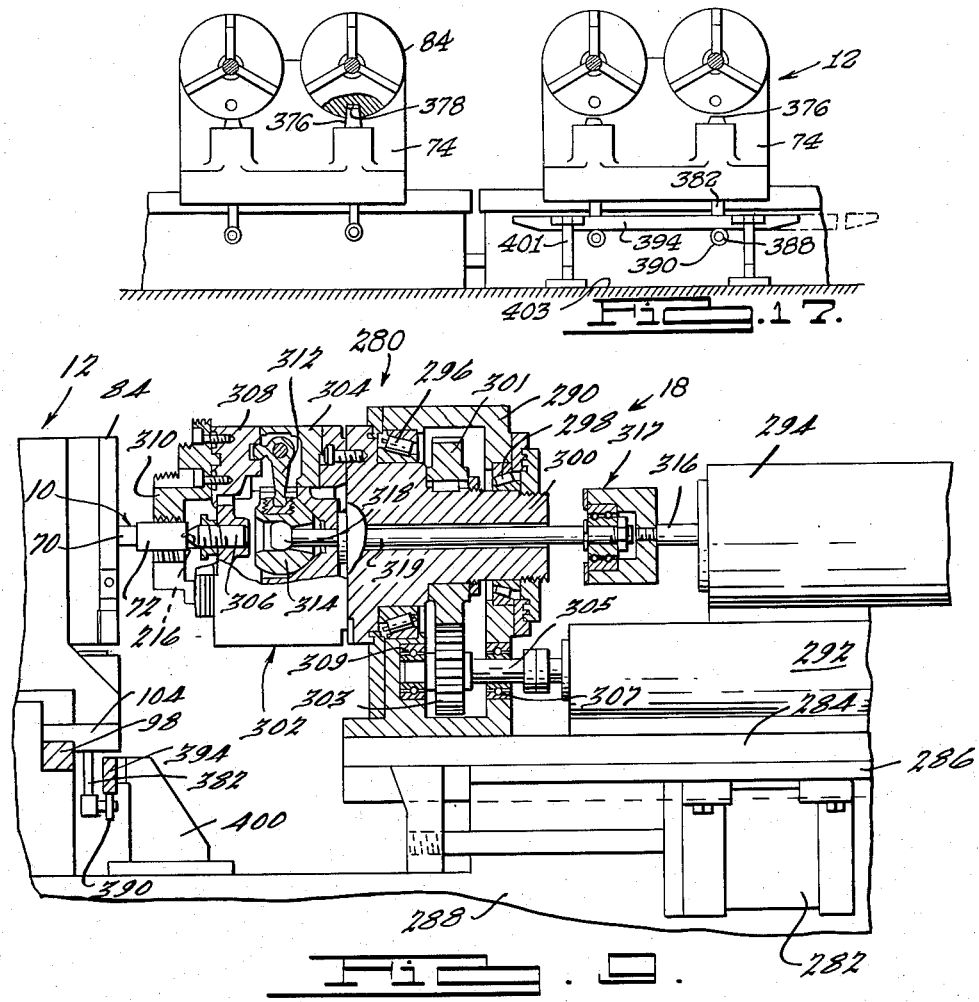
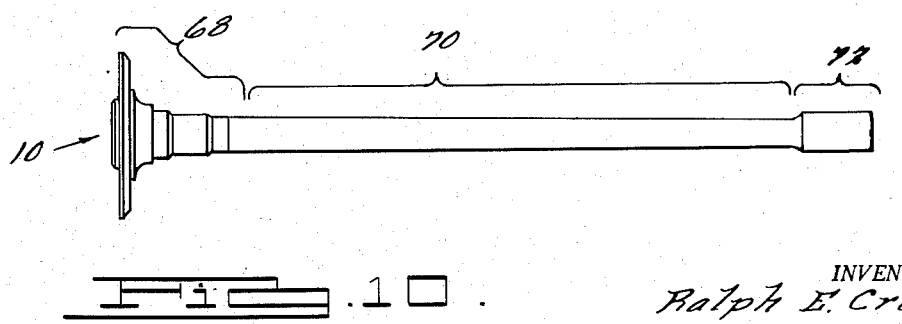
INVENTOR.
Ralph E. Cross.
BY
Harness, Dickey & Pierce
ATTORNEYS

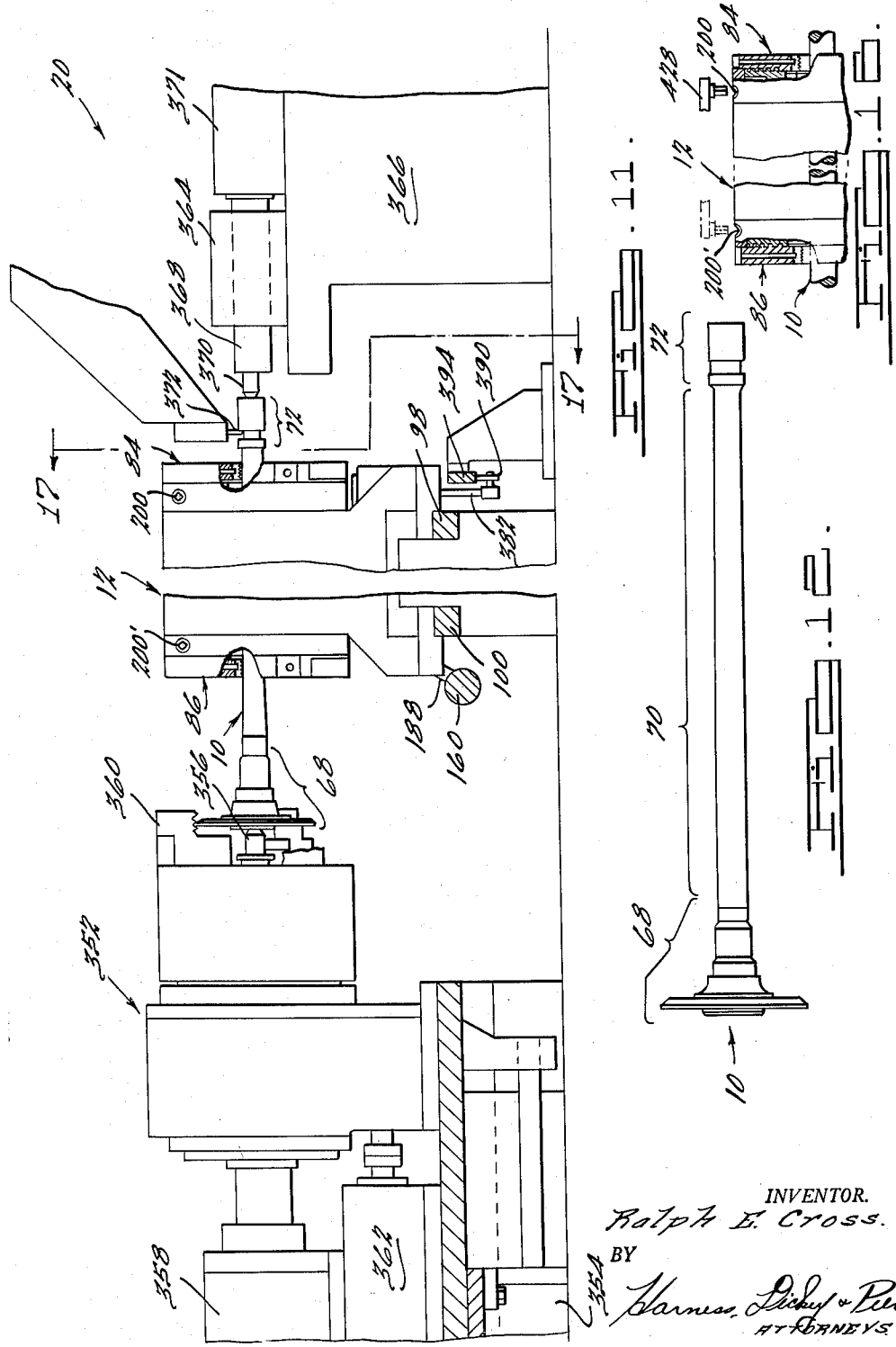

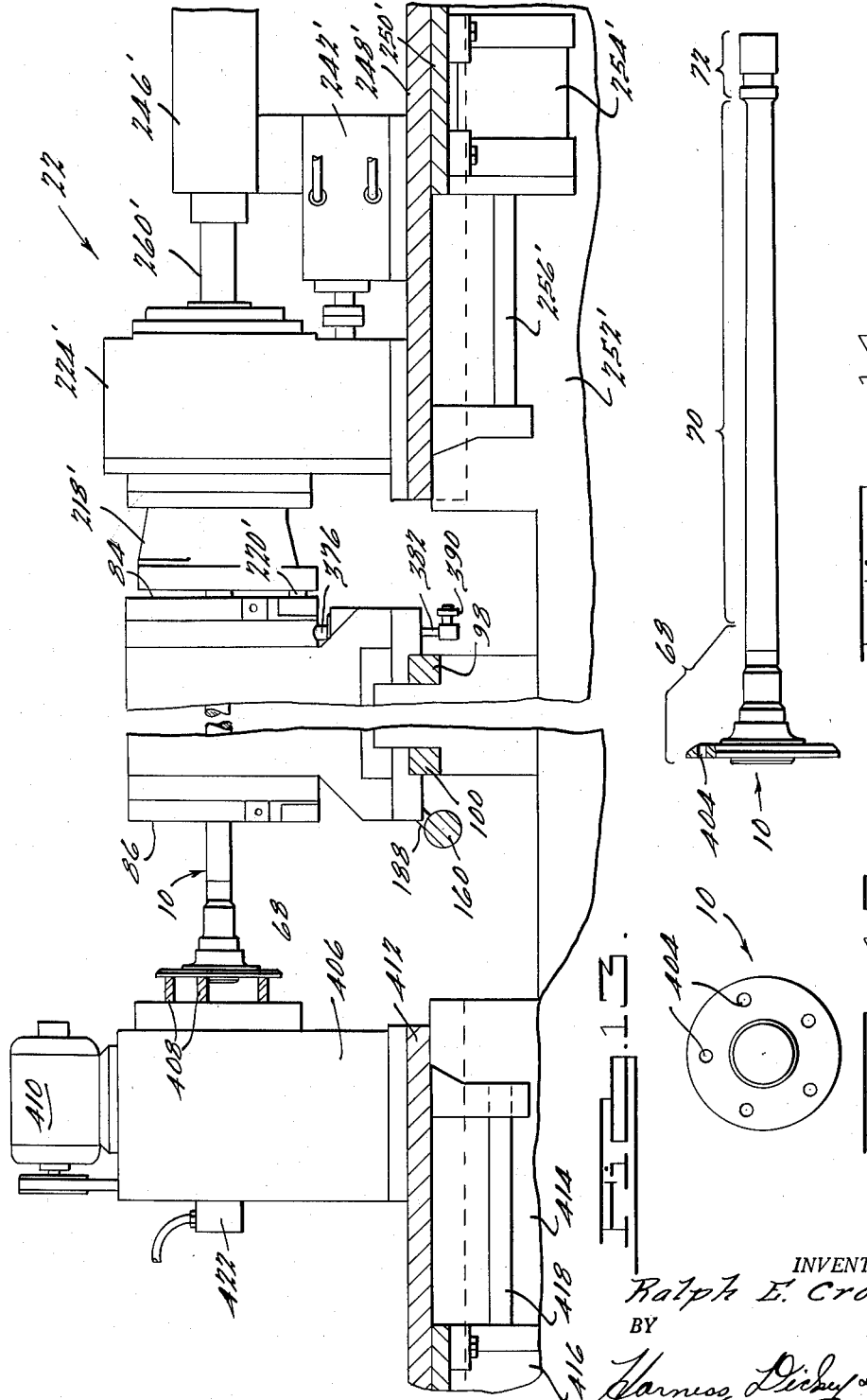

United States Patent Office 2,982,004
Patented May 2, 1961

2,982,004

MACHINE

Ralph E. Cross, Grosse Pointe Shores, Mich., assignor to The Cross Company, Fraser, Mich., a corporation of Michigan Filed Mar. 28, 1957, Ser. No. 649,236

9 Claims. (Cl. 29—33)

This invention relates to automatic machines and more particularly to machines in which workpieces are sequentially indexed to each of a plurality of work stations.

The principles of the invention are particularly applicable to the machining of elongated workpieces and are illustratively embodied in an apparatus capable of performing machining operations on either or both ends of a shaft.

In the disclosed embodiment of the invention, elongated workpieces are carried by workpiece-supporting pallets, with transporting means being intermittently effective to index the pallets, and hence the workpieces, along a series of spaced work stations. At each such station, the pallet is accurately located and clamped.

For certain machining operations, it is desirable that the workpiece be rotatable, such as in turning, in grinding and in the drilling of holes on the longitudinal axis of the workpiece. In the representative arrangement disclosed, the workpiece is rotatably supported upon the supporting pallet by means of a tubular spindle provided with a pair of spaced-apart chucks engaging the workpiece. By maintaining the inter-chuck distance at a maximum commensurate with adequate projection of both ends of the workpiece for end-portion machining, a high degree of workpiece rigidity is obtained, permitting relatively heavy machining operations to be performed without producing dimensional inaccuracies resulting from bending and lateral deflection of the workpiece.

The workpiece may be rotatably driven either by imparting rotational motion to the pallet spindle, or by separately chucking either end of the workpiece, and each such method is utilized in the disclosed arrangement, spindle drive being illustrated for the drilling of the turning centers and for certain end-portion machining operations, and end drive being illustrated for certain other end-portion maching operations.

In certain of the disclosed operations, the workpiece is turned between centers in addition to being rigidly supported by the pallet. In practice, where the workpiece supporting pallet is indexed from station to station, it is difficult to obtain precise alignment between the axis of the turning centers at each of plural stations and the longitudinal axis of the supported workpiece, that is, indexing errors may arise. Additionally, it has been found that the relief of the internal stresses in the workpiece resulting from the machining operations may cause the workpiece to bow slightly when it is removed from the spindle, so that there is a slight departure between the axis of the turning centers and the axis of the spindle. This deviation, with the disclosed workpiece, may be as small as a few ten-thousandths of an inch, which, however, may be excessive. To avoid this condition, means are provided for unclamping the workpiece from the pallet preparatory to the final, finish turning operation, the final operation being performed with the workpiece supported solely by the turning centers, insuring that the finish cut is made about the axis of the turning centers rather than about the axis of the spindle.

The equipment is also adaptable to the performance of machining operations in which the workpiece is fixed against rotation, as in the disclosed drilling of holes parallel to but off of the longitudinal axis of the shaft. In the preferred arrangement, means are associated with the pallet for selectively locking the spindle against rotation relative to the remainder of the pallet, and cooperating means are provided at selected stations for automatically controlling the operation of that locking means. Additionally, since fixed-workpiece operations may be performed at each of a plurality of stations, means are or may be provided for turning the workpiece to a selected, uniform reference position at all such stations, the aforesaid locking means being then effective to maintain the workpiece in that reference position. The system flexibility is enhanced by such an arrangement since turning operations may, if desired, be interspersed with fixed-workpiece operations, although the workpiece can be locked in a selected rotational position at one work station and held in that position during its progress through succeeding work stations.

A more complete understanding of the principles, objects and features of the invention may be obtained from the following detailed description of a preferred embodiment of that invention when read with reference to the accompanying drawings in which:

Fig. 4 is an enlarged vertical sectional view taken substantially along the line 4—4 of Fig. 1;

Fig. 5 is an enlarged vertical sectional view taken substantially along the line 5—5 of Fig. 1;

Fig. 6 is an enlarged vertical sectional view taken substantially along the line 6—6 of Fig. 1;

Fig. 7 is a view of the workpiece after the completion of the operations performed thereon in the station illustrated in Fig. 2;

Fig. 8 is an enlarged vertical sectional view taken substantially along the line 8—8 of Fig. 1 showing the head portion of the equipment at a second work station;

Fig. 9 is an enlarged vertical sectional view taken substantially along the line 9—9 of Fig. 1 showing the tail portion of the equipment at the second station;

Fig. 10 is a view of the workpiece after the operations performed at the station represented in Figs. 8 and 9 have been completed;

Fig. 11 is an enlarged vertical sectional view taken substantially along the line 11—11 of Fig. 1 illustrating equipment at a third work station;

Fig. 12 is a view of the workpiece after the operations performed at the station illustrated in Fig. 11 have been completed;

Fig. 13 is an enlarged vertical sectional view taken substantially along the line 13—13 of Fig. 1, representing the equipment at a fourth work station;

Fig. 14 is a partially cutaway view of the workpiece after the operations performed at the work station illustrated in Fig. 13 have been completed;

Fig. 15 is an end view of the workpiece illustrated in Fig. 14;

Fig. 16 is a fragmentary, enlarged vertical sectional view taken substantially along the line 16—16 of Fig. 1, showing the equipment at a fifth work station; and Fig. 17 is a longitudinal sectional view taken on the line 17—17 of Fig. 11 and particularly illustrating the mechanism for locking the work carriers in predetermined rotational positions.

The equipment in certain aspects partakes of the nature of that disclosed in my Patent 2,745,167, granted May 15, 1956, the disclosure of which is hereby incorporated by reference, and certain of the advantages and merits there attributed to the construction also accrue to the equipment disclosed herein. Certain of the features claimed in the application of Ralph E. Cross and Kurt O. Tech, Serial No. 649,144, filed March 28, 1957, may also be applied to a machine of the type here disclosed.

Figure 1:
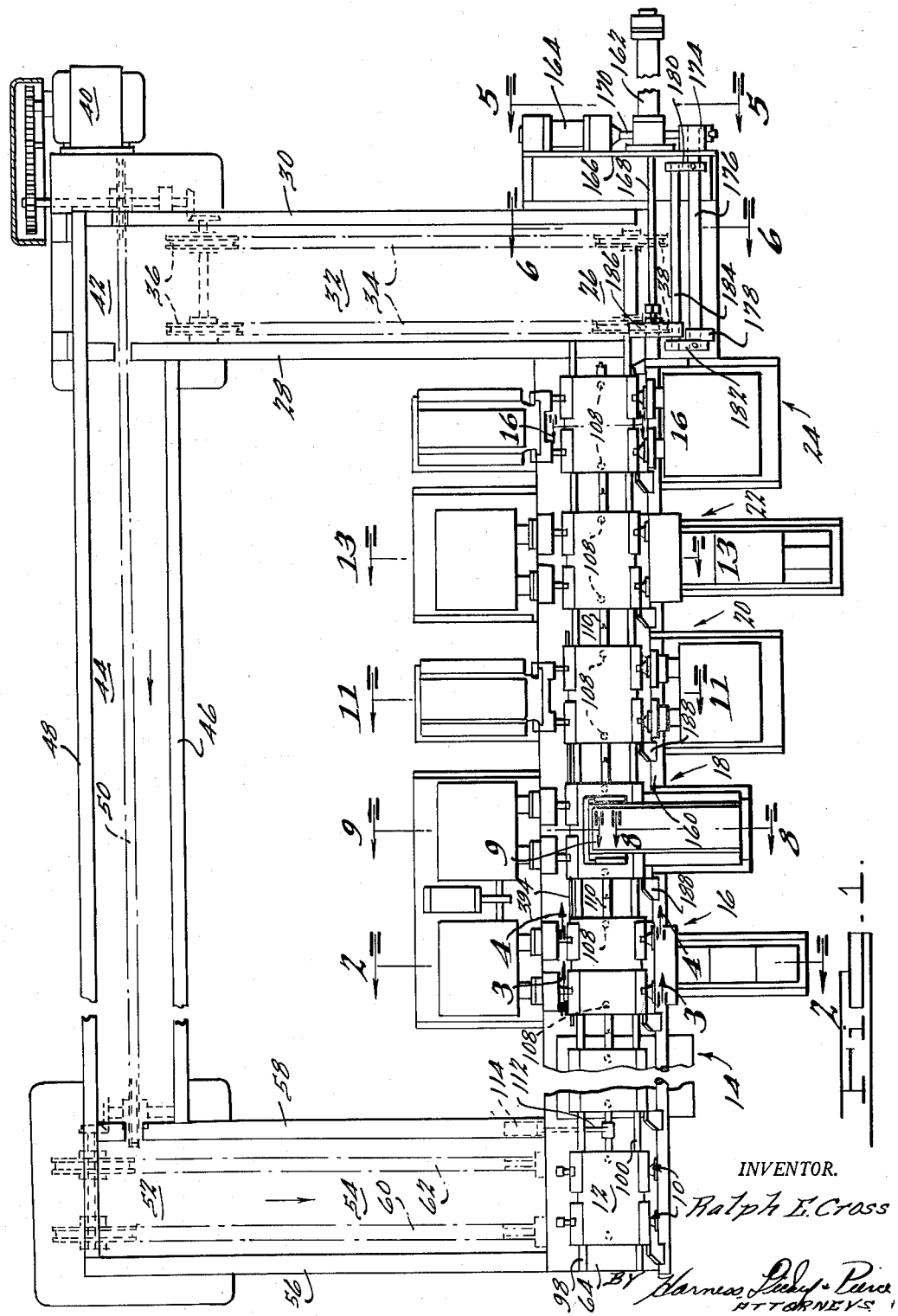
Fig. 1 is a top plan view showing an automatic machine embodying the principles of the invention.

Referring now to Fig. 1 of the drawings, the workpieces 10 are placed on supporting pallets 12 (representatively, two workpieces per pallet) at a load and unload station 14. Pallets 12 at times function as driven headstocks in a manner similar to the traveling headstocks shown in the above-noted Cross patent, but the term supporting pallet has been employed herein since the forces for rotating the workpieces are not always applied through the pallet spindles. The loaded pallets are sequentially transferred in a step-wise fashion to the plural illustrated work stations 16, 18, 20, 22 and 24. The number and kind of work stations, will, of course, depend upon the work operations being performed. It is preferred that each work station, except for the transporting mechanism, be an entity in itself so that the equipment at any one work station may be readily removed and replaced with other equipment if desired. Additionally, it is preferred that the equipment at each work station be spaced from the equipment at each other station so that vibration induced by the machine operations at one station will not be readily transmitted to the other stations.

When a supporting pallet 12 is moved to the right from work station 24, it enters a transfer station 26 and then moves along rails 28 and 30, constituting a part of conveyor leg 32. Movement is imparted to the pallet by a pair of conveyor chains 34 trained around sprockets 36 and 38 and driven, through appropriate gearing, by motor 40. As each pallet reaches transfer station 42, it is transferred to the back conveyor leg 44, being moved along rails 46 and 48 by conveyor chain 50, also driven by motor 40. At transfer station 52, the pallet is transferred to conveyor leg 54, being moved along rails 56 and 58 by conveyor chains 60 and 62, also driven, through appropriate gearing, by motor 40.

A pallet 12 arriving at transfer station 64 is engaged by an indexing-type transporting means to be described, and is transferred to the load and unload station 14 where the completed workpieces are removed and new workpieces inserted. It will be apparent that by appropriate changes in the conveyor, work stations may be disposed along any of the conveyor legs, if desired.

For purposes of illustration, it is assumed that the workpiece is an axle shaft, the outline of the forging of which is illustrated in Fig. 7 of the drawings. Axle shaft 10 includes a head portion 68, including a flange, a body portion 70 and a tail portion 72 which, in the final product, is normally splined. The disclosed equipment is intended to perform operations only on the head and tail end portions 68 and 72 so that the body portion 70 need not be accessible to the working tools.

Figure 2:
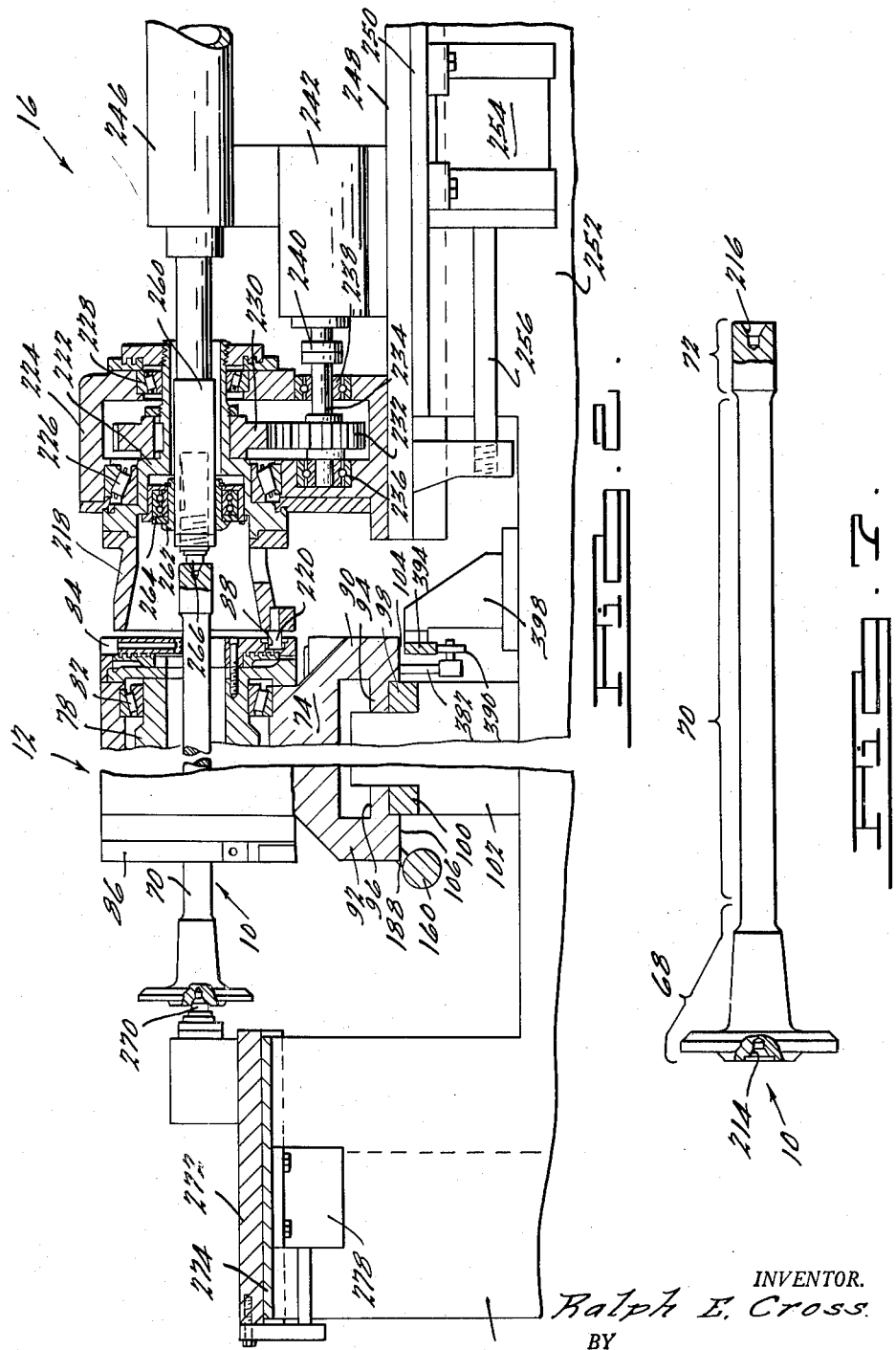
Fig. 2 is an enlarged vertical sectional view taken substantially along the line 2—2 of Fig. 1 and illustrating equipment at one work station.
Figure 3:
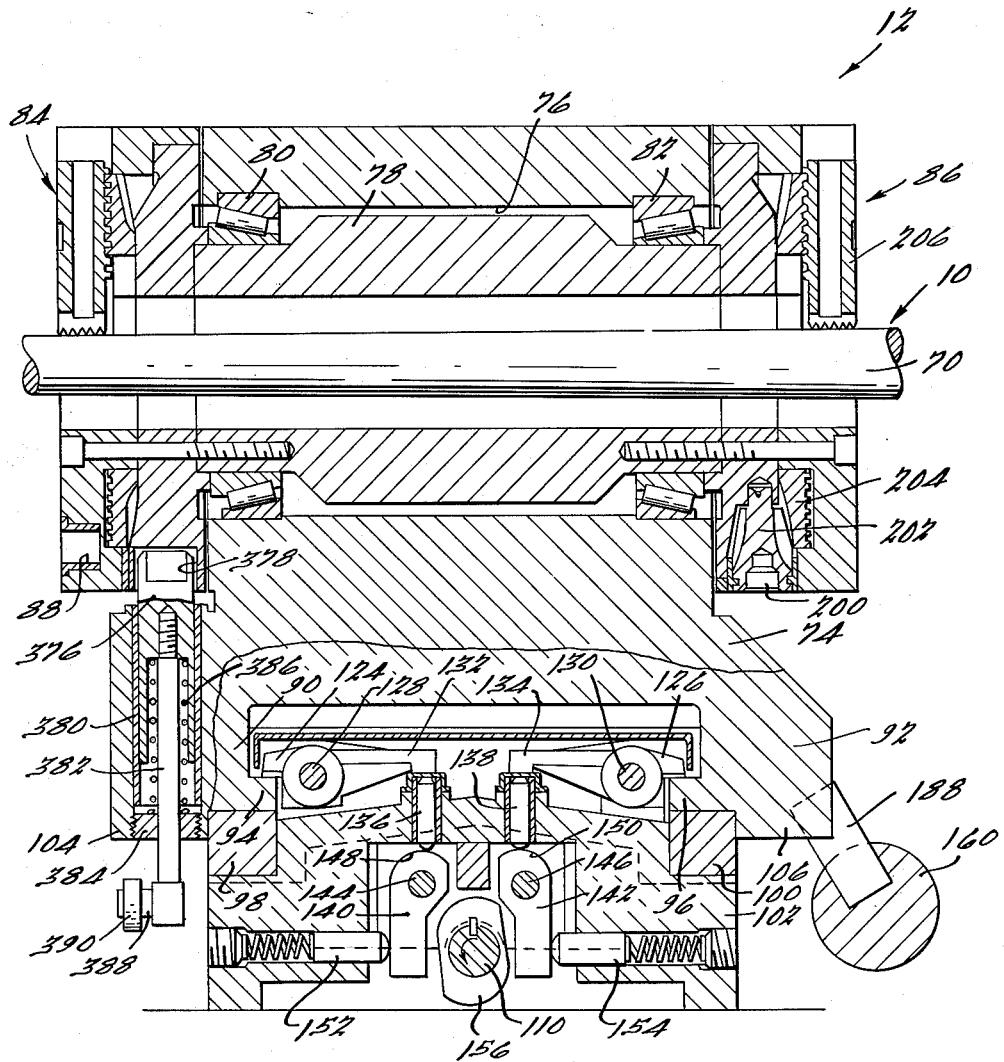
Fig. 3 is an enlarged vertical sectional view taken substantially along the line 3—3 of Fig. 1.

The holding or supporting pallets 12 are dual units accepting the workpieces 10 in pairs, the relationship between a workpiece 10 and a pallet 12 beng illustrated in Fig. 2 of the drawings and the details of the pallet being more clearly illustrated in Fig. 3 of the drawings.

The pallet 12 is a casting (or is formed of castings) including a body 74 (Fig. 3) the upper portion of which is provided with two parallel bores, such as the illustrated bore 76. A tubular spindle 78 is supported within bore 76 by means of bearings 80 and 82 so that the spindle 78 may be rotated relative to the body 74 of the pallet. Multiple-jaw chucks 84 and 86, of conventional form, are secured to the ends of spindle 78 so that, at the loading station, the tail portion 72 of the axle shaft 10 may be passed through chucks 84 and 86 and spindle 78, bringing the body portion 70 of the workpiece within the spindle 78. With the workpiece appropriately longitudinally positioned chucks 84 and 86 are manually or automatically tightened to clamp the workpiece in position.

With the representative, conventional chuck illustrated, a manually or power-driven key or wrench is inserted in the chuck socket, such as socket 200 in chuck 86, to rotate the pinion 202 about its longitudinal axis. Pinion 202 meshes with annular gear 204 to rotate gear 204 about the longitudinal axis of the chuck. The chuck jaws, including jaw 206, are mounted for radial translational movement and are provided with spiral threads mating with corresponding threads on the gear 204 so as to be driven inwardly or outwardly in response to rotation of gear 204.

Unless constrained in a manner to be described, the workpiece 10, the chucks 84 and 86 and the tubular spindle 78 may be rotated as a unit relative to the body 74 of the pallet 12. As one means for imparting rotational motion to that unit, the face of the chuck 84 is provided with a single drive pin socket 88 which is selectively engageable by mechanism to be described.

Body portion 74 is provided with depending portions 90 and 92 terminating in inwardly-turned flange portions 94 and 96. The lower surfaces of flanges 94 and 96 are machined and adapted to engage machined rails 98 and 100 supported upon base element 102. Rails 98 and 100 extend the length of the indexing conveyor run as is illustrated in Fig. 1 of the drawings. Skirts 90 and 92 are provided with further depending portions 104 and 106 (Figs. 2 and 3) the inner faces of which engage the sides of rails 98 and 100, respectively, to insure accurate positioning of the workpieces 10 along their longitudinal axes at each of the work stations. The lower surfaces of depending portions 104 and 106 are preferably employed as runners cooperating with rails 28, 30, 46, 48, 56 and 58 (Fig. 1) at the side and back legs of the conveyor system to prevent unnecessary wearing of the precision surfaces which engage rails 98 and 100.

At each work station the pallet is accurately located and firmly clamped preparatory to the work operation. The locating means, which is similar to that disclosed in the above-identified patent, comprises a plurality of locating pins 108 (Fig. 1) movable by shaft 110, linkage 112 and hydraulic cylinder 114, or equivalent means, into engagement with locating recesses in the undersurface of the pallets 12. As may best be seen in the sectional view of Fig. 4, each of the locating pins 108 is slidably disposed within a sleeve bearing 116 secured within an embossment on the base element 102, a pair of pins 108 being being provided at each station to engage a pair of recesses, such as recess 109, in each of the pallets 12.

The pallets and their workpieces are unclamped at the completion of the work operation and indexed to the next succeeding station. As may best be seen in Figs. 5 and 6 of the drawings, the piston rod 170 of hydraulic cylinder 164 is connected through a link 172 and a crank arm 174 to a shaft 176, the outboard end of which is supported by frame 166 (Fig. 1) and the inboard end of which is rotatably mounted in an upstanding support element 178 (Figs. 1 and 6). Parallel arms 180 and 182 are secured to rod 176 near the opposite ends thereof and support a second rod 184 in spaced parallelism with the rod 176. Crank arm 186, secured to a transfer bar 160, is formed with a notch in one end which slidably receives the rod 184. Retraction of piston rod 170 will produce counterclockwise rotation of shaft 176 (Figs. 5 and 6), and rotation of the shaft 160 in a clockwise direction through a selected angle. Conversely, extension or advancement of piston rod 170 will produce counterclockwise rotation of transfer bar 160.

Transfer bar 160 is provided with a plurality of appropriately spaced lugs or dogs 188 (Figs. 1, 3 and 4) which are moved, as a result of the oscillatory motion of the transfer bar 160, between a position in which they will engage a trailing face of the pallets 12 and a second position in which they will clear the pallets during their reciprocating motion. At the completion of a work operation and after the pallets 12 are unclamped, the transfer bar 160 is moved longitudinally to the right (Fig. 1) by cylinder 162, with the lugs or dogs 188 being in position to engage surfaces of the pallets 12 and thereby translate the several pallets one station's interval to the right. The supporting pallets are then located and clamped in the stations. At a time prior to the instant at which the supporting pallets are to be indexed to the next succeeding station, the transfer bar 160 is rotated to bring the lugs or dogs 188 out of engagement with the supporting pallets (Fig. 4) and is then translated longitudinally to the left to bring the several dogs or lugs 188 into position to be rotated into engagement with the supporting pallets preparatory to advancing those pallets to the next station.

The machine illustrated in Fig. 1 of the drawings is representatively shown to embody a load and unload station 14, and five work stations each of which is adapted to perform specific work operations upon the workpieces 10. In work station 16, the workpieces 10 are supported by the pallet 12, and are rotated by imparting rotational motion to the pallet spindles. Drills which are representatively fixed against rotational motion, but which are movable in translation along the longitudinal axis of the pallet spindles, are advanced into engagement with each end of each of the workpieces 10 at station 16, to drill the centers 214 and 216 (Fig. 7) at the ends of the axle. At the second work station, station 18, the workpieces continue to be supported by the supporting pallets, but the rotational driving forces are applied by chucking the tail end of each of the workpieces 10 to a drive head, turning the workpieces, and performing turning operations upon their head ends.

At the third work station 20, the workpieces continue to be rigidly supported by the supporting pallet and are additionally supported by centers, and are rotated by applying rotation forces to the head end of the workpieces, turning operations being performed upon the tail ends of the workpieces.

At the fourth work station 22, the workpieces continue to be rigidly supported by the supporting pallet, with means being provided to rotate the pallet spindles to a preselected position and to maintain those spindles in that rotational position throughout the machining operations in that station. Tools are then advanced into engagement with the head of the workpiece to drill a plurality of holes lying off the longitudinal axis of the workpiece.

At the fifth illustrated work station 24, the workpieces are supported between centers, means being provided to unclamp those workpieces from the supporting spindles. In the illustrated arrangement, the workpieces are rotated by establishing a driving engagement with their head ends, a finish turning operation being performed upon their tail portions, although the head portions could alternatively or additionally be turned.

It will be appreciated that additional operations can be performed, that the operations in which the workpieces are fixed against rotation may be performed at any appropriate point in the sequence, and that those fixed-workpiece operations may be either interspersed rotating-workpiece operations, or grouped together along the line.

The equipment at the first work station 16 is illustrated in Fig. 2 of the drawings. The workpiece 10 is engaged by chucks 84 and 86 on the spindle 78 of the pallet 12. In order to impart rotational motion to the workpieces 10, a member 218, carrying a drive pin 220 at its forward face, is supported by a drive spindle 222 which is rotatably mounted within a casting 224 by means of bearings 226 and 228. A gear 230 surrounds and is secured to the drive spindle 222 and is adapted to mesh with a gear 232, mounted upon a shaft 234 rotatably supported in the casting 224 by means of bearings 236 and 238. Coupling 240 connects the shaft 234 to a motor 242 so that energization of motor 242 will produce rotation of member 218 and of the drive pin 220.

The casting 224, the motor 242, and a cylinder 246 are mounted upon a slide 248 which is movable in translation in a direction parallel with the longitudinal axes of the workpieces 10 upon ways 250 mounted upon base 252, the force for moving these elements being applied by a hydraulic (or pneumatic) cylinder 254 having a piston rod 256 connected to the slide 248. When the piston rod 256 of cylinder 254 is advanced, the slide 248, and parts carried thereby, are advanced until the drive pin 220 is brought into engagement with the chuck 84, cylinder 254 continuing to exert forces to maintain those parts in abutment. If the drive pin is not aligned with socket 84, energization of the motor 242 will cause the drive pin 220 to move along the face of the chuck until it becomes aligned with and seated in the socket 88, whereupon the spindle 78 and workpiece 10 will be rotated. However, in the preferred practice, the chucks and spindle are locked in a preselected rotational position when they leave station 24 and during the travel of the pallets around the conveyor and through the load and unload station 14. While those elements are unlocked as the pallet enters station 16, the spindle tends to remain rotationally static.

It will be appreciated that if pairs of workpieces 10 are worked upon concurrently, then another set of the described equipment will be provided to rotate the spindle supporting the second workpiece.

Cylinder 246, which may be hydraulically or pneumatically operated, drives a tool holder 260 which is guided by a sleeve 262 supported within the sleeve 222 by means of bearing 264. The tool holder 260 and the center drill 266 carried thereby are fixed against rotation but are movable, by cylinder 246, in translation along the longitudinal axis of the workpiece 10. By this means, the center drill 266 is advanced into the workpiece, as the workpiece rotates, to form the tail end center 216 (Fig. 7).

At the head end of the workpiece 10, a center drill 270 is mounted upon a slide 272, supported on the ways 274 on base 276, and is advanced into the head of the workpiece 10, as the workpiece rotates, by means of a hydraulic or pneumatic cylinder 278 having a piston rod connected to the slide 272.

When the center holes 214 and 216 (Fig. 7) have been drilled, cylinders 246 and 278 withdraw the center drills 266 and 270 and cylinder 254 is caused to move the slide 248 to the right to remove the drive pin 220 from its engagement with the drive pin socket 88, terminating rotation of the workpiece 10. At the termination of the work cycle, the locating pins are withdrawn from the pallet 12 and the pallet is transferred to the next station, station 18, by means of the transfer mechanism including transfer bar 160 and transfer dogs 188.

At the next station in the representative sequence, station 18, illustrated in Figs. 8 and 9 of the drawings, plural surfaces at the head end portion 68 (Fig. 10) of the workpiece 10 are turned to their proper diameters. The view of Fig. 9 should be placed to the right of the view of Fig. 8 for proper orientation.

At this station, workpieces 10 continue to be held by the pallet 12 in the same manner as in the previous station, but in this case there is no direct driving connection to any chuck of the pallet so that the spindles are permitted freely to rotate with the workpieces 10 in response to other driving forces.

The drive head 280 (Fig. 9) is associated with the tail 72 of the workpiece 10. When the pallet 12 has been brought into and clamped in position, the hydraulic or pneumatic cylinder 282 is actuated to move the slide 284 to the left relative to and upon the ways 286 on base 288. Slide 284 carries a casting 290, a motor 292, and a cylinder 294. Casting 290 rotatably supports, by means of bearings 296 and 298, a tubular drive spindle 300 to which a compensating chuck 302 of a conventional type is secured.

Spindle 300 carries a gear 301 positioned to mesh with a gear 303 mounted upon a shaft 305 which is rotatably supported on the casting 290 by means of bearings 307 and 309. Shaft 305 is coupled to the motor 292 so that, on energization of the motor, the sleeve 300 and the chuck 302 will be rotated.

Chuck 302 includes a body portion 304, rigidly and centrally supporting a center 306 which is adapted to engage the center recess 216 in the tail end of the workpiece 10. A plurality of radially slidable elements, such as element 308, are supported by the body portion 304 and carry individual chuck jaws, such as jaw 310. Element 308 and hence jaw 310, is movable in radial translation by a bell crank 312, one arm of which engages element 308 and the other arm of which engages a member 314 which is movable in translation along the longitudinal axis of the chuck. Piston rod 316 of the hydraulically or pneumatically actuated cylinder 294 is connected by coupling 317 to a rod 319 having an end ball 318 which engages member 314, coupling 317 serving to permit relative rotation but prevent relative translational movement between rods 316 and 319. Retraction of rod 316 serves to move the member 314 to the right, bringing the several chuck jaws into engagement with the tail portion 72 of the workpiece 10; whereas extension of the piston rod 316 will permit release of those chuck jaws. In use, the cylinder 282 is actuated to move the slide 284, and parts carried thereby, to the left until the center 306 is seated in the centering recess 216 in the workpiece 10. The cylinder 294 is then energized to retract its rod 316, bringing the chuck jaws into engagement with the end portion 72 of the workpiece 10, the jaws automatically adjusting to the contour of that end portion 72, in accordance with the characteristics of conventional compensating chucks, so that proper driving engagement is achieved without disturbing the relationship between the center 306 and the center hole in the end of the workpiece 10. Energization of the motor 292 will then produce rotation of the workpiece 10.

Adjacent the head end 68 of the workpiece 10 (Fig. 8), the live center 322 is rotatably supported by means of bearings 326 within a tubular sleeve 328 to which an end plate 330 is secured. Sleeve 328 is slidably disposed within sleeve bearing 332 which is secured within a casting 334 supported upon the base 336. The piston rod 338 of a pneumatically or hydraulically actuated cylinder 340 is fixed to the end plate 330. When the pallet 12 has been moved into position at the station and clamped, the cylinder 340 is actuated to move the live center 322 into engagement with the center hole 214 in the head end of the workpiece 10.

Consequently, each workpiece 10 at the station shown in Figs. 8 and 9 is rigidly but rotatably supported by the pallet 12 and is additionally supported between centers, the rotational driving force being exerted upon the tail end of the workpiece.

A cutting tool 342 is mounted in a conventional tracer device 344 which includes a stylus (such as a roller) 346, adapted to engage a template 348. In accordance with well-known practices, tracing device 344 is slidably supported by a member 350 which is moved, by a driving means representatively illustrated as a cylinder 351, in leftward and rightward directions in the view of Fig. 8 upon ways 353. In customary practice, the vertical position of assembly 344 including tool 342 is controlled by means of the stylus 346 acting through a hydraulic servo mechanism, and it is contemplated that such a mechanism, or its equivalent, be employed. However, for simplicity of illustration, a cylinder 355 is shown to be supported by member 350 and to have its piston rod connected to assembly 344. During the cutting operation, cylinder 351 produces movement of the cutting tool along the workpiece to turn the several surfaces of the end portion 68, with cylinder 355 controlling the cutting pressure and with stylus 346 controlling the contour of the turned surfaces.

It is an important feature of the present arrangement that the template 348 is mounted upon the pallet 12 so that its surface lies in preselected precise relationship with the axis of the workpiece 10. As a result, the workpiece surfaces formed by tool 342 are accurately related to the workpiece axis.

At the completion of the operations at the second work station, the workpiece 10 appears as illustrated in Fig. 10 of the drawings. The workpiece, completed to the noted extent, is then moved by the pallet 12 to work station 20, the details of which are presented in Fig. 11 of the drawings. At this station, the tail end portion 72 of the workpiece 10 is turned to the shape illustrated in Fig. 12 of the drawings. The illustrated workpiece 10 continues to be rigidly held by the chucks 84 and 86 of the pallet 12 at station 20, with that workpiece being driven from its head end by a drive head 352.

Drive head 352 is similar and may be effectively identical to drive head 280 illustrated in Fig. 9 of the drawings and consequently will be but generally described. The drive head 352 is moved to the right by cylinder 354 until the center 356 is seated in the center hole 214 (Fig. 7) in the head end of the workpiece 10. Piston 358 is then actuated to bring the jaws of the compensating chuck 360 into driving engagement with the periphery of the flange at the head end of the workpiece, and the motor 362 is energized to rotate the chuck 360, and hence the workpiece 10, relatively to the body of the pallet 12.

Adjacent the tail end portion 72 of the workpiece 10, a bearing block 364, supported upon a base 366, slidably accepts the piston rod 368 of the hydraulically or pneumatically actuated cylinder 370. Rod 368 terminates in dead center 370 which is moved, upon actuation of cylinder 371, into engagement with the hole 216 (Fig. 7) in the tail end of the workpiece 10. While a dead center is illustrated for convenience, it will be appreciated that a live center, such as that illustrated in Fig. 8 of the drawings, may be employed if desired.

The cutting tool 372 is brought into engagement with the surfaces of the end portion 72 of the workpiece by conventional and well-known means not illustrated in detail. The guiding of the tool 372 may, if desired, be accomplished through the use of a tracer device similar to that illustrated in Fig. 8 of the drawings.

In the illustrated representative sequence of operations, it is assumed that an initial, rough cut is made upon the end portion 72 at station 20. By virtue of the proximity of the end portion 72 to the chuck 84 coupled with the support given that end portion by the center 370, a relatively heavy cut may be made without producing inaccuracies resulting from deflection of the workpiece under the cutting forces.

At each of the stations 16, 18 and 20 thus far described (and at station 24 to be described) the workpieces are rotated about their longitudinal axes during the work operations. At station 22 (Fig. 1) the workpieces are fixed against rotation about their longitudinal axes, after proper orientation is achieved. To permit selective locking of the workpieces against rotation, means are associated with each of the supporting pallets 12 to selectively lock the tubular spindles, which hold the workpieces, against rotation relative to the remainder of that pallet.

In the disclosed arrangement, as best illustrated in Figs. 3 and 17 of the drawings, a locking plunger 376 is selectively movable into engagement with a socket 378 formed at one point (spaced from and larger than the socket 200) on the periphery of the body of the chuck 84, that chuck body being bolted to or otherwise made integral with the tubular spindle 78 and therefore with the body of the chuck 86, and a similar locking plunger is provided for each other spindle on the pallet, as shown in Fig. 17.

Locking plunger 376 is slidably disposed within a sleeve 380 mounted in an aperture in the casting 74, the plunger 376 being capable of extending above the level of the upper end of the sleeve 380 and into engagement with the socket 378 as illustrated. Plunger 376 is screwed or otherwise secured to a rod 382 which extends through a central aperture in a nut 384 closing the lower end of the aperture in the casting 74. A compression spring 386 surrounds a portion of the rod 382 and acts between a surface of the plunger 376 and the upper surface of the nut 384 to exert a force tending to move the plunger 376 upwardly. Rod 382 terminates in a laterally extending shaft 388 which rotatably supports a cam follower roller 390. Unless roller 390 is prevented from moving upwardly by means to be described, spring 386 will force plunger 376 toward the position illustrated in Fig. 3 of the drawings, so that when the socket 378 is brought into alignment with the plunger 376 by means to be described, the plunger 376 will enter that socket and thereafter lock the tubular spindle 78 and the workpiece carried thereby against rotation until the plunger 376 is withdrawn.

The selective actuation of the locking plunger 376 is controlled by means at the stations. A camming bar is mounted at each of the stations at which the spindles are to be rotated and in a position to engage the cam follower roller 390 to move and hold that roller in a lower position in which the plunger 376 is disengaged from the socket 378. In the representatively disclosed arrangement, the spindles are to be rotated at the adjacent stations 16, 18 and 20 so that a continuous cam bar 394 (Fig. 1) extends from a point to the left of station 16 to a point to the right of station 20. Since the spindles are to be held stationary in station 22, no such cam bar is provided at that station and none is provided at station 24.

Obviously, the leading edge of the cam bar 394, and of any other provided cam bars, must be tapered as shown in Fig. 17 so that the lower surface of the cam bar at the point of initial engagement with the cam follower roller 390 is above the level of the roller when the plunger 376 is in engagement with the socket 378, so that the roller 390 can thereafter be cammed down to a lower level to vertically displace the plunger 376. The cam bars are mounted in any suitable fashion as, for example, by means of a series of brackets, such as bracket 398 (Fig. 2), supported upon the base 252 at station 16, and bracket 400 (Fig. 9) supported upon the base 288 at station 18 and brackets 401 on base 403 in station 20 (Fig. 17).

As is shown in Figs. 2, 9, 11 and 17 the cam bar 394 at stations 16, 18 and 20 forces the cam following roller 390 to move the plunger 376 out of engagement with the locking socket in the spindle (or in parts moving therewith), so that the spindle 78 of the pallet 12 is not inhibited from rotating about its longitudinal axis at those stations.

Since no cam bar is provided at station 22 (Figs. 13 and 17), cam follower roller 390 is permitted to move upwardly to project plunger 376 into engagement with the surface of the chuck 84. Since rotation of the workpiece or workpieces 10 will have terminated before the pallet 12 has arrived at station 22, and since the spindles will not necessarily have stopped with their locking sockets in position to be engaged by the plungers 376, means are provided at station 22 for rotating the workpiece, the spindle and the chucks to locking position. This means is representatively shown to be similar to that employed in station 16 and detailed in Fig. 2 of the drawing, including a bell housing 218′ (Fig. 13), carrying a drive pin 220′, engageable with the drive pin socket in the face of the chuck 84, a casting 224′, a slide 248′ supported on ways 250′ on base 252′, a hydraulically or pneumatically actuated cylinder 254′, operating through rod 256′ to move the slide 248′ and all parts carried thereby to the left to bring drive pin 220′ into engagement with chuck 84. The motor 242′ which has a driving connection with and produces rotation of the bell housing 218′ should, in this case, be arranged to provide but a low maximum torque, and may, to facilitate that end, be a hydraulically or pneumatically actuated motor.

Rotation of the member 218′ will produce rotational motion of the driving pin 220′ until it arrives at the point on the chuck 84 at which the drive pin socket is disposed. Drive pin 220′ will then enter that socket, under the continuing force exerted by cylinder 254′, and the spindle, the chucks 84 and 86 and the workpiece 10 will thereafter be rotated under the force exerted by motor 242′ until the locking socket has been brought into alignment with the plunger 376. At that point, plunger 376, under the impetus of the spring force, will enter the socket 378 and thereafter lock the spindle, the chucks and the workpiece against further rotation. By providing but a single locking socket in the chuck 84, the locked rotational position of the workpiece is fixed so that the rotational orientation of the workpiece will be the same at each of the plurality of stations at which the workpieces are locked against rotation.

The operation which is to be performed at station 22 is the drilling of a plurality of holes 404 (Figs. 14 and 15) through the flange at the head portion 68 of each of the workpieces 10. Consequently, a conventional multiple spindle drill head 406 carrying a plurality of drills 408 rotatable by a motor 410 is mounted upon a slide 412 supported upon ways on the base 414. Upon actuation of the hydraulically or pneumatically driven cylinder, the piston rod 418 thereof is moved to the right in the view of Fig. 13 to move the slide 412 to the right to bring the drills 408 into operating relationship with the workpiece 10.

After the drilling operation is completed, the slides 412 and 248′ are retracted by clinders 416 and 254′, respectively, and the pallet 12 is unclamped and advanced to station 24 (Fig. 1). While the workpieces are to be rotated on centers at station 24, the chucks are released during the turning. Consequently, a cam bar may be advantageously omitted at this station so that the spindles are maintained in their selected rotational positions, facilitating both the operations at the load and unload station and the driving engagement at station 16, as above noted.

The equipment at station 24, for performing the finish turning of the end portion 72, can be and is herein assumed to be effectively identical to that provided at station 20. After the head end of the workpiece has been chucked and after the centers have been brought into engagement with the workpiece (in accordance with the showing of Fig. 11), the chucks 84 and 86 (Fig. 16) are released. Any appropriate means may be provided for performing this operation including a manually operated key or a pneumatic or hydraulic wrench 428 adapted to engage the socket 200 in the chuck 86 and the corresponding socket 200′ in the chuck 84. Therefore, at station 24, each workpiece 10 is turned between centers without being supported by the pallet 12.

If further operations are to be performed upon the workpieces 10, the chucks including chucks 84 and 86 should be again brought into clamping relationship with the workpieces at station 24. If station 24 is the final work station, it may not be necessary to reclamp the workpieces, although such clamping will insure that the workpieces will not accidentally fall from the pallet during their travel around the conveyor system to the unloading station.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims.

What is claimed is:

1. In a machine tool including a series of inline and juxtaposed work stations at certain of which work operations are performed requiring rotation of workpieces and at the other of which work operations are performed requiring that workpieces be held stationary, a plurality of holding pallet means each having a rotatable spindle equipped with chuck means for holding and rotatably supporting a workpiece, means for moving said holding pallet means progressively and in succession through said work stations, rotary drive means at said stations for rotatably turning said workpieces after the latter have moved into said stations, releasable locking means carried by and movable with said pallet means normally holding said spindles against rotation, said locking means being rendered automatically operable by movement of said pallet means into said other work stations and by rotation of said workpieces therein to lock the workpieces in said other stations against rotation and in a stationary predetermined angular or rotated position to prevent further turning thereof by said rotary drive means, and disabling means at said certain work stations engageable with said locking means as said pallet means move into said certain work stations and operative by such engagement to release said locking means to render the latter inoperative while said holding pallet means are in said certain work stations, whereby workpieces in said certain stations are rotatably driven.

2. The combination as set forth in claim 1 wherein the rotary drive means in each said certain work station is a relatively high torque drive and the rotary drive means in each said other work station is a relatively low torque drive.

3. The combination as set forth in claim 1 wherein the rotary drive means in each said certain work station is a relatively high torque drive and the rotary drive means in each said other work station is a relatively low torque drive; and wherein each said locking means is a catch associated and rotatable with a respective one of said spindles and a latch engageable with said catch when the latter is rotated into register therewith to hold the spindle thereafter rotatably stationary against the action of said relatively low torque drive means.

4. The combination as set forth in claim 1 wherein the rotary drive means in each said certain work station is a relatively high torque drive and the rotary drive means in each said other work station is a relatively low torque drive; and wherein each said locking means is a member associated with and rotatble by a respective one of said spindles, said member provided with an annular peripheral surface having a socket or catch therein controlling by its position in said surface the stationary position of the workpiece associated with said spindle, and a detent or latch spring biased against said surface and unless rendered inoperative by said disabling means being interengageable with said socket when the latter is rotated into register therewith whereby to hold a workpiece associated with said spindle normally stationary in a predetermined rotated position.

5. A machine tool having a plurality of juxtaposed work stations and ways extending through said stations, discrete individual supporting pallets movable successively through said stations on said ways and having rotatable work carriers adapted to carry workpieces to be formed in said stations; means for locating and clamping said supporting pallets in said stations; tools in said stations operative to act on work in said stations; relatively high torque rotary drive means in certain of said stations engageable with the work carriers of pallets in said certain stations; relatively low torque rotary drive means in other of said stations engageable with the work carriers of pallets in said other stations to rotatively drive the same; catch means on said work carriers; latch means on said pallets movable into engagement with respective catch means operable to hold said work carriers stationary in predetermined rotational positions and adapted to hold said work carriers rotatably stationary against the action of said relatively low torque drive means; means for holding the latch means of pallets in said other stations engaged with their respective catch means while said pallets are in said other stations whereby to hold said work carriers rotatably fixed; and means in said certain stations rendered operative by movement of said pallets into said certain stations and coactive with the latch means of pallets in said certain stations to disengage said latch means from their catch means and to hold the same disengaged while the pallets are in said certain stations whereby said high torque means are free to rotatably drive the work carriers in said certain stations.

6. A machine tool having a plurality of juxtaposed work stations and ways extending through said stations, discrete individual supporting pallets movable successively through said stations on said ways and having rotatable work carriers adapted to carry workpieces to be formed in said stations; means for locating and clamping said supporting pallets in said stations; tools in said stations operative to act on work in said stations; relatively high torque rotary drive means in certain of said stations engageable with the work carriers of pallets in said certain stations to rotatably drive the same; relatively low torque rotary drive means in other of said stations engageable with the work carriers of pallets in said other stations to rotatively drive the same; catch means on said work carriers; latch means on said pallets movable into engagement with respective catch means operable to hold said work carriers stationary in predetermined rotational positions and adapted to hold said work carriers rotatably stationary against the action of said relatively low torque drive means; spring means acting on said latch means to hold the same normally engaged with said catch means when said pallets are in said other stations; and means in said certain stations coactive with the latch means of pallets in said certain stations to disengage said latch means from their respective catch means and to hold the same disengaged while the pallets are in said certain stations whereby said high torque means are free to rotatably drive the work carriers in said certain stations.

7. A machine tool having a plurality of juxtaposed work stations and ways extending through said stations, discrete individual supporting pallets movable successively through said stations on said ways and having rotatable work carriers adapted to carry workpieces to be formed in said stations; means for locating and clamping said supporting pallets in said stations; tools in said stations operative to act on work in said stations; relatively high torque rotary drive means in certain of said stations engageable with the work carriers of pallets in said certain stations; relatively low torque rotary drive means in other of said stations engageable with the work carriers of pallets in said other stations to rotatively drive the same; catch means on said work carriers; latch means on said pallets movable into engagement with respective catch means operable to hold said work carriers stationary in predetermined rotational positions and adapted to hold said work carriers rotatably stationary against the action of said relatively low torque drive means; cam followers on and movable with said latch means; and cam bars in said certain stations engageable with said cam followers as said supporting pallets move into said certain stations and operative to hold the latch means associated with said cam followers disengaged from their respective catch means while said pallets are in said certain stations, whereby said high torque means are free to rotatably drive the work carriers in said certain stations.

8. A machine tool having a plurality of juxtaposed work stations and ways extending through said stations, discrete individual supporting pallets movable successively through said stations on said ways and having rotatable work carriers adapted to carry workpieces to be formed in said stations; means for locating and clamping said supporting pallets in said stations; relatively high torque rotary drive means in certain of said stations engageable with the work carriers of pallets in said certain stations; relatively low torque rotary drive means in other of said stations engageable with the work carriers of pallets in said other stations to rotatively drive the same; tools in said certain stations operative to act on rotatably driven workpieces in said certain stations; tools in said other stations operative to act on stationary workpieces in said other stations; catch means on said work carriers; latch means on said pallets movable into engagement with respective catch means operable to hold said work carriers rotatably stationary in predetermined rotational positions and adapted to hold said work carriers rotatably stationary against the action of said relatively low torque drive means; cam followers on and movable with said latch means; cam bars in said certain stations engageable with said cam followers as said supporting pallets move into said certain stations and operative to hold the latch means associated with said cam followers disengaged from their respective catch means while said pallets are in said certain stations whereby said high torque means are free to rotatably drive the work carriers in said certain stations, said cam bars disengaging said cam followers as the supporting pallets carrying the same move out of said certain stations and into said other stations whereby to permit engagement of said latch means with said catch means upon rotation of the work carriers by said relatively low torque rotary drive means.

9. In a machine tool having a plurality of juxtaposed work stations and ways extending through said stations, discrete individual supporting pallets movable successively through said stations on said ways and having rotatable work carriers adapted to carry workpieces to be formed in said stations; means for locating and clamping said supporting pallets in said stations, and rotary drive means in said stations for rotatably driving work carriers of pallets in said work stations, means permitting drilling and other operations to be performed on stationary workpieces in certain of said stations and turning or other operations to be performed on rotatably driven workpieces in other of said stations comprising locking devices carried by and movable with said pallets releasably engageable with said work carriers and normally holding the same against rotation as said pallets move on said ways and while said pallets are in said certain stations whereby to render ineffectual the rotary drive means in said certain stations, and means in said other stations disposed to engage said locking devices as said pallets move into said other stations and operative by such engagement to release said locking devices whereby to render the rotary drive means in said other stations effective to rotatably drive the work carriers in said other stations.

References Cited in the file of this patent

UNITED STATES PATENTS

| | | |
|---|---|---|
| 551,119 | Hakewessell | Dec. 10, 1895 |
| 979,152 | Gross | Dec. 20, 1910 |
| 1,206,528 | Goddu | Nov. 28, 1916 |
| 1,520,684 | Aldeen | Dec. 30, 1924 |
| 1,587,261 | White | June 1, 1926 |
| 1,608,443 | Thacher | Nov. 23, 1926 |
| 1,700,721 | Groene | Jan. 9, 1929 |
| 1,984,176 | Cone | Dec. 11, 1934 |
| 2,118,260 | Marsilus | May 24, 1938 |
| 2,249,148 | Lovely | July 15, 1941 |
| 2,427,712 | Casler | Sept. 23, 1947 |
| 2,505,007 | Rolland | Apr. 25, 1950 |
| 2,646,152 | Retz | July 21, 1953 |
| 2,745,167 | Cross | May 15, 1956 |